(12) United States Patent
Rafei et al.

(10) Patent No.: US 10,216,787 B2
(45) Date of Patent: Feb. 26, 2019

(54) METHOD, APPARATUS, AND COMPUTER-READABLE MEDIUM FOR CONTEXTUAL DATA MINING USING A RELATIONAL DATA SET

(71) Applicant: Geographic Services, Inc., McLean, VA (US)

(72) Inventors: Keyvan Rafei, Great Falls, VA (US); Alex Taranenko, Silver Spring, MD (US)

(73) Assignee: Geographic Services, Inc., McLean, VA (US)

( * ) Notice: Subject to any disclaimer, the term of this patent is extended or adjusted under 35 U.S.C. 154(b) by 846 days.

(21) Appl. No.: 14/210,283

(22) Filed: Mar. 13, 2014

(65) Prior Publication Data

US 2014/0280341 A1 Sep. 18, 2014

Related U.S. Application Data

(60) Provisional application No. 61/780,871, filed on Mar. 13, 2013.

(51) Int. Cl.
*G06F 17/30* (2006.01)
(52) U.S. Cl.
CPC .. *G06F 17/30386* (2013.01); *G06F 17/30864* (2013.01)
(58) Field of Classification Search
None
See application file for complete search history.

(56) References Cited

U.S. PATENT DOCUMENTS

| | | | |
|---|---|---|---|
| 7,756,881 B2 | 7/2010 | Crivat et al. | |
| 7,958,027 B2 | 6/2011 | Lawrence | |
| 8,065,253 B2 | 11/2011 | Simmons et al. | |
| 2003/0131007 A1* | 7/2003 | Schirmer | G06F 17/30958 |
| 2007/0288447 A1 | 12/2007 | Andris et al. | |
| 2009/0106210 A1* | 4/2009 | Slezak | G06F 17/30598 |

(Continued)

OTHER PUBLICATIONS

International Search Report and Written Opinion cited in corresponding International Application No. PCT/US2014/026802 dated Aug. 19, 2014.

(Continued)

*Primary Examiner* — Christopher J Raab
(74) *Attorney, Agent, or Firm* — Amardeep S. Grewal; Reed Smith LLP

(57) ABSTRACT

An apparatus, computer-readable medium, and computer-implemented method for contextual data mining using a relational data set includes monitoring one or more data sources for information relating to the relational data set, the relational data set comprising one or more data objects in one or more classes, detecting activity corresponding to a first data object in the one or more data objects based at least in part on information gathered from at least one data source, determining whether the activity exceeds a predefined threshold, identifying a second data object in the one or more data objects which is connected to the first data object based at least in part on an analysis of relationships between the one or more data objects, and transmitting information relating to the second data object based at least in part on a determination that the activity exceeds the predefined threshold.

42 Claims, 16 Drawing Sheets

(56) References Cited

U.S. PATENT DOCUMENTS

| | | | |
|---|---|---|---|
| 2009/0319515 A1 | 12/2009 | Minton et al. | |
| 2010/0010968 A1* | 1/2010 | Redlich | G06F 17/30672 |
| | | | 707/E17.014 |
| 2011/0125743 A1* | 5/2011 | Immonen | G06F 17/30241 |
| | | | 707/737 |
| 2011/0202326 A1 | 8/2011 | Salemann | |
| 2011/0208822 A1 | 8/2011 | Rathod | |
| 2014/0032271 A1* | 1/2014 | Nordstrand | G06Q 30/0205 |
| | | | 705/7.34 |

OTHER PUBLICATIONS

Extended European Search Report cited in corresponding European Application No. 14775134.1 dated Oct. 28, 2016.
Tong R: "Detecting and Tracking Opinions in Online Discussions", Internet Citation, Jun. 20, 2001, Retrieved from the Internet: URL: http://www.sims.berkeley.edu/resources/affiliates/workshops/webmining/schedule/html.

* cited by examiner

| Rasta | Feature Class – Polygon | The *Rasta* feature class contains locations of the Rasta Armed Group with Ethnic group information based on location. |
|---|---|---|
| FRF | Feature Class – Polygon | The *FRF* feature class contains locations of the FRF Armed Group with Ethnic group information based on location. |
| FDLR | Feature Class – Polygon | The *FDLR* feature class contains locations of the FDLR Armed Group with Ethnic group information based on location. |
| FARDC | Feature Class – Polygon | Polygon feature class showing locations of FARDC Armed Group with Ethnic group information based only on location. |
| Linear_Hydrography | Feature Class – Line | Line feature class showing rivers and streams. |
| Africa | Feature Class – Polygon | Polygon feature class containing countries in Africa. |
| ADM1 | Feature Class – Polygon | Polygon feature class containing first level administrative boundaries (Province) for South Kivu. |
| ADM2 | Feature Class – Polygon | Polygon feature class containing second level administrative boundaries (Districts) for South Kivu. |
| ADM3 | Feature Class – Polygon | Polygon feature class containing third level administrative boundaries (Chiefdoms) for South Kivu. |
| Roads | Feature Class – Line | Line feature class containing roads. |
| Lakes | Feature Class – Polygon | Polygon feature class containing two major lakes bordering South Kivu; Lake Kivu and Lake Tanganyika. |
| Map_Symbols | Feature Dataset | The Map Symbols feature dataset contains unnamed map symbology (Airports, Catholic Missions, Ferries, Gas Stations, Hotels, Mines, Port Lighthouses, and Protestant Missions). |
| Relationship Classes for Hierarchical Layers | Relationship Class | This geodatabase also contains two relationship classes. These are not visible layers in the Map, but they create a navigable "Family Tree" in the "Identify" window. The relationship classes are:<br>• ETHNICGROUP_CHIEFDOM (Ethnic Groups to Chiefdom)<br>• CHIEFDOM_TRIBE (Chiefdoms to Tribes) |

| Attribute Name | Attribute Description |
|---|---|
| OBJECT_ID | This is a unique number given to each feature found on the map. This is a GSI produced number. |
| MF | Modify Flag. A code that determines the modification level of feature data. Upper-case characters only allowed.<br>A = Added feature information<br>M = Modified feature information<br><br>Notes:<br>- Adding a new feature is considered an add and the MF would be an A, the UFI would be assigned a sequential number, and the UNI would be left blank. If you have to tie more than one name to a feature, the names would share the same UFI number, but the second name would get an M modify flag and the UNI would still be left blank.<br>- Adding a name to an existing feature is considered a modify and the MF would be an M, the UFI would be copied from the existing feature UFI, and the UNI would be left blank.<br>- Modifying a feature's coordinate(s) is considered a modify and the MF would be an M. The coordinates must match for all feature names, having the same UFI, which either have a MF of A or M. The coordinates of name records that do not have an entry in the MF will take changes made to the modified record.<br>- Changing a name type (NT) is considered a modify and the MF would be M for the names of the feature that the change affected. |
| RC | The region code determines the character mapping for diacritics and special characters in the FULL_NAME and GENERIC fields. The region code is filled in based on the country filled in the CC1 field (country code 1). Refer to the NGA website for a country by country list.<br><br>1 = Western Europe/Americas<br>2 = Eastern Europe<br>3 = Africa/Middle East<br>4 = Russia/Central Asia<br>5 = Asia/Pacific<br>6 = Vietnam |
| UFI | Unique Feature Identifier. A number that uniquely identifies the feature. A Temporary UFI is populated for added features. This number is unique only within map sheets. |
| UNI | Unique Name Identifier. A number that uniquely identifies a name. This number shall not be filled in for added feature names nor should it be touched for modified feature names (see MF above). |
| UGI | Unique GRC ID (GRC - Geographic Reference Coordinates) value, which must be an integer. If an UGI is specified, it must be matched up with a Feature entry that contains FULL_NAME, CC1, and UFI. The LAT, LONG, USID1, USID2, and USID3 fields must be filled in for the GRC as well. Not Populated, this is system generated. |
| GMF | Modify Flag for the GRC listed in UGI. The valid values are:<br>A - Add new GRC entry<br>M - Modify existing GRC entry<br>D - Delete a GRC entry<br><br>Not Populated, this is system generated. |
| GCC | GRC Country Code. A two alphabetic character code uniquely identifying a geopolitical entity (a.k.a. country). Upper-case characters only allowed. This must be specified for a GRC Entry.<br><br>Not Populated, this is system generated. |
| LAT | Latitude of the feature in decimal degrees. |
| LONG | Longitude of the feature in decimal degrees. |
| UTM | Universal Transverse Mercator coordinate grid reference. |
| JOG | Joint Operations Graphic reference. Not Populated, this is system generated. |

| | |
|---|---|
| FC | Feature Classification:<br>A = Administrative region<br>P = Populated place<br>V = Vegetation<br>L = Locality or area<br>U = Undersea<br>R = Streets, highways, roads, or railroad<br>T = Hypsographic<br>H = Hydrographic<br>S = Spot feature<br><br>Not Populated, this is system generated. |
| DSG | The designation code field describes the nature of the physical or manmade feature. A two to five-character code used to identify the type of Geoname feature a name is applied according to NGA specifications. For example, PPL is populated place, MT is mountain, and STM is stream or river. The DSG is selected by using analysis of the name, source materials, and imagery. |
| PC | The population code is a graduated numerical scale number that indicates the importance of a populated place. PC is only filled in for features with a DSG of population features. |
| CC1 | The primary country code (CC1) is a two letter alphabetic code according to NGA standards indicating the country in which a feature is located. |
| ADM1 | First-order administrative division, primary administrative division of a country, such as a state in the United States. A value of 00 indicates a feature that crosses ADM1 boundaries. |
| ADM2 | Second-order administrative division. A subdivision of a first-order administrative division, such as a county in the United States. Not populated for this project as there are no numerical ADM2 codes. |
| POP | Population. Numeric field usually used to display population data (examples: 2500, 300, and 250000). No text is allowed in this field. |
| ELEV | The elevation is a numeric field for entry of elevation data. The elevation data is extracted from the map source and entered in meters with no commas. |
| CC2 | Secondary Country Code. A two alphabetic character code uniquely identifying the country code of a particular name if different than that of the feature (International features). |
| NT | The name type field identifies what type of name(s) is identified with a feature. The different name types are represented by a code. Those codes are:<br>N = Native Name<br>NS = Native Script<br>V = Variant Name<br>VS = Variant Script<br>D = Daggered<br>DS = Daggered Script<br>C = Conventional Name |

| Field | Description |
|---|---|
| LC | Language code is an alphabetic code according to NGA standards that identifies the language of a name. |
| SHORT_FORM | A specific part of the name that could substitute for the full name. Substitute the diacritics with the codes from the Character Set Conversion Table document in this field. |
| GENERIC | A generic term is a common noun that describes the nature of a geographic feature. The generic terms is written exactly as it appears in the FULL_NAME field.<br>• Generic terms might not always directly correspond to the appropriate designation code.<br>• Generic terms are reversed from reading order in the FULL_NAME field.<br>• A false generic is a generic that does not indicate the type of feature names. False generic are not reversed and kept in the reading order as it appears on the map.<br>• Generics for PPLs are never reversed. |
| SORT_NAME | A form of the full name that allows for easy sorting of the name into gazetteer sequence. It is comprised of the specific name, generic name, and any articles or prepositions. All diacritics are substituted for QWERTY characters, all characters are upper-cased, numerals are lower-cased (0-9 = a-j), spaces are stripped out, and commas replaced with space. This field is included for the benefit of the end user of the data to aid in the sorting of names if required. This field is only populated in select circumstances such as railroad stations/stops, first-order administrative divisions, country names etc. |
| FULL_NAME | The FULL_NAME field contains the name exactly as it is found on the map. Names with generic terms are reversed, with the generic term following the geographic terms separated by a comma (i.e. Washington, Mount)<br>• Abbreviations and Acronyms are expanded where possible.<br>• Parenthetical names on the TLM source following a primary name that is unofficial or a variant are entered as variant name. A descriptive word that follows a primary name is not processed, although it can be used to determine DSG. |
| USID1 | The Unique Source ID 1 field indicated that name was found on the map source. A USID1 value of NGA GNDB DATA indicates an unprocessed name. |
| USID2 | The Unique Source ID 2 field indicated if a features location is verified with imagery. |
| USID3 | The Unique Source ID 3 - Not used in this project |
| FL | Flag Field - Not populated |
| COMMENTS | Comments and further information |

| Attribute Name | Attribute Description |
|---|---|
| MINE | Name of the Mine |
| COMMENTS | Comments and further information |
| LAT | Latitude of the feature in decimal degrees. |
| LONG | Longitude of the feature in decimal degrees. |
| ADM1 | First-order administrative boundaries (Province) for South Kivu. |
| ADM2 | Second-order administrative boundaries (Districts) for South Kivu. |
| ADM3 | Third-order administrative boundaries (Chiefdoms) for South Kivu. |
| TRIBE | Tribe residing at the location of the mine. |
| LOCATION | Location of the Mine |
| RESOURCE_1 | Resource mined. |
| RESOURCE_2 | Second resource mined if one exists. |
| RESOURCE_3 | Third resource mined if one exists. |
| NUMBER_OF_WORKERS | Number of workers at this operation |
| ARMED_GROUP_1 | Armed group with activity at this mine |
| COMMAND_1 | Commander of ARMED_GROUP_1 |
| ARMED_GROUP_2 | Second armed group with activity at this mine if one exists. |
| COMMAND_2 | Commander of ARMED_GROUP_2 |
| ARMED_GROUP_3 | Third armed group with activity at this mine if one exists. |
| COMMAND_3 | Commander of ARMED_GROUP_3 |
| ARMED_GROUP_ACTIVITY_1 | Specifics of ARMED_GROUP_1's activity at this mine. |
| ARMED_GROUP_ACTIVITY_2 | Specifics of ARMED_GROUP_2's activity at this mine. |
| ARMED_GROUP_ACTIVITY_3 | Specifics of ARMED_GROUP_3's activity at this mine. |
| TITLE_HOLDER | Title holder of mineral rights in this mine. |
| LAND_OWNERSHIP | Traditional land ownership of area where mining operations occur. |
| BUYERS | Main buyers of resources from this mine. |
| OTHER_BUYERS | Other buyers of resources from this mine. |
| USID1 | The Unique Source ID1 field |

| Attribute Name | Applicable Layers | Attribute Description |
|---|---|---|
| GROUP | FARDC, FDLR, FRF, Rasta, PARECO | Armed Group Name |
| LOCATION | FARDC, FDLR, FRF, Rasta, PARECO | Location Name |
| UNIT | FARDC, FDLR | Unit Name |
| COMMANDER | FARDC, FDLR, FRF, Rasta, PARECO | Armed Group Commander |
| STRENGTH | FARDC, FDLR, FRF, Rasta, PARECO | Strength of Armed Group |
| COMMENTS | FARDC, FDLR | Additional Information about the armed group at this location. |
| TRIBE | FARDC, FDLR, FRF, Rasta, PARECO | Tribe located at this location |
| ETHNIC_GROUP | FARDC, FDLR, FRF, Rasta, PARECO | Ethnic group located at this location |
| LAT | FARDC, FDLR, FRF, Rasta, PARECO | Latitude of the feature in decimal degrees. |
| LONG | FARDC, FDLR, FRF, Rasta, PARECO | Longitude of the feature in decimal degrees. |
| ADM1 | FARDC, FDLR, FRF, Rasta, PARECO | First-order administrative boundaries (Province) for South Kivu. |
| ADM2 | FARDC, FDLR, FRF, Rasta, PARECO | Second-order administrative boundaries (Districts) for South Kivu. |
| ADM3 | FARDC, FDLR, FRF, Rasta, PARECO | Third-order administrative boundaries (Chiefdoms) for South Kivu. |
| TYPE | FRF, Rasta, PARECO | The type of armed group presence in the area, i.e. "Liaison Post" |

| Attribute Name | Description |
|---|---|
| OBJECTID | GSI-assigned unique ID for each feature. This field is calculated so that it persists with the dataset. The auto-generated OBJECT_ID field changes with data exporting or updates so this provides a persistent unique id. |
| FULL_NAME | This is the display name. For Tribes it is the Tribe name. For ALL_NAMES it is the lowest available level. In some cases, the Tribe is not available so the Chiefdom is the lowest level captured for example. |
| TRIBE | The Tribe for each entry. Hierarchy 3. |
| CHIEFDOM | The Chiefdom for each entry. Hierarchy 2. |
| CHIEFDOM_CHIEF | The Chiefdom Chief |
| PREV_CHIEF | The Previous Chief of the Chiefdom. |
| ETHNIC_GROUP | The Ethnic Group for each entry. Hierarchy 1. |
| LANGUAGE | Language spoken by each entry. |
| ADM1 | First-order administrative boundaries (Province) for South Kivu. |
| ADM2 | Second-order administrative boundaries (Districts) for South Kivu. |
| ADM3 | Third-order administrative boundaries (Chiefdoms) for South Kivu. |
| LOCATION | The location where the entry resides. |
| LAT | Latitude of the feature in decimal degrees. |
| LONG | Longitude of the feature in decimal degrees. |
| RELIGION | Religion practiced by each entry. |
| ARMED_GROUP_1 | Armed group located at this location if one exists. This is included in the tribal data to provide as much data as possible in one layer. This attribution is based on location alone and is derived from other feature classes in this database. |
| ARMED_GROUP_2 | Second armed group located at this location if one exists. This attribution is based on location alone. |
| ARMED_GROUP_3 | Third armed group located at this location if one exists. This attribution is based on location alone. |
| COMMODITY_1 | Commodity mined at this location if one exists. This attribution is based on location alone. |
| COMMODITY_2 | Second commodity mined at this location if one exists. This attribution is based on location alone. |
| COMMODITY_3 | Third commodity mined at this location if one exists. This attribution is based on location alone. |
| COMMODITY_4 | Fourth commodity mined at this location if one exists. This attribution is based on location alone. |
| TITLE_HOLDER | Title holder of mineral rights in this location. This attribution is based on location alone. |
| LAND_OWNERSHIP | Traditional land ownership of area where mining operations occur. This attribution is based on location alone. |
| BUYERS | Buyers of commodities from this mining location. This attribution is based on location alone. |

METHOD, APPARATUS, AND COMPUTER-READABLE MEDIUM FOR CONTEXTUAL DATA MINING USING A RELATIONAL DATA SET

RELATED APPLICATION DATA

This application claims priority to U.S. Provisional Application No. 61/780,871, filed Mar. 13, 2013, the disclosure of which is hereby incorporated by reference in its entirety.

BACKGROUND

Data mining technologies are indispensable for processing large quantities of unstructured data. Data mining relies on identifying and extracting names, places, or words that match a particular search criteria or specification and typically involves the initial steps of discovering sources and mining those sources for relevant information.

A number of technologies focus on automating aspects of the data mining process, but the complete automated solution is still yet to be realized. For example, there are a large number of open source mining and source discovery tools available today such as from Kapow Software. There are also solutions that organize information that has been extracted from sources such as MarkLogic® and Lexis-Nexis™ as well as software such as Esri's ArcGIS™ for the creation and visualization of geospatial data.

Source discovery is often a manual process because it takes an analyst time to evaluate various datasets for usefulness, accuracy, and validity to a specific application. There are tools in use that help with the process of traversing the World Wide Web (WWW) to discover online sources (e.g., Ficstar, Web Grabber, Fetch, Mozenda), but these need to be directed and bounded by specific search parameters to scope that search, all of which require input from a person. In addition, sources that are not online or digital cannot be discovered in an automated fashion.

Once discovered, mining those sources for specific nuggets of information is possible, especially if the search is done in English. However, exploiting these searches in foreign languages, especially when dealing with non-Roman character sets can be a challenge. While many tools support UTF-8 encoding, which supports character matching even in non-Roman character sets, there are often challenges in dealing with misspellings and characterizing the words within the languages (e.g., identifying that a word is actually a name or a person). Given the variety of Romanization systems, there are often dozens of ways of spelling one name. For example, the name Muhammed has one spelling in Arabic but has numerous spellings in Romanized characters. This poses challenges to data mining systems in matching words with multiple spellings, especially when mining online media.

Human Geography (HG) is becoming increasingly important given the recent uprisings in the Middle East and North Africa, as well as threats from cartels in Mexico and South America. While there are potentially many definitions of HG, the term can be described as tying human information to geospatial locations. Many solutions focus on technology and on automating the process of collecting human geography information such as with data mining and language technologies. Automated approaches are valuable because these approaches offer the benefit of quickly drilling through large quantities of data to discover specific pieces of information and identifying patterns. However, there are still limits to the ability of automated mining technologies to find, assimilate, and geospatially locate information.

Existing data mining engines frequently struggle to place the mined data in context, leading to misidentifications of relationships or patterns. For example, many data mining engines would connect the financial institution "Berkshire Hathaway" with the actress "Anne Hathaway." Although the names may match exactly, appropriate context would show that there is no relationship between these two entities.

The importance of contextual analysis is even more pronounced in the area of HG data mining. For example, a data mining engine may identify the name "As Sadlan" in an unstructured document. Without any contextual information, there would be no way of knowing any social, cultural, or geographic affiliations of this person and no way to reach new conclusions based on the mined data.

Improved systems for contextualizing data discovered through data mining are desired.

BRIEF DESCRIPTION OF THE DRAWINGS

FIGS. 6A-6J illustrate data corresponding to a Human Geography relational data set according to an exemplary embodiment.

DETAILED DESCRIPTION

While methods, apparatuses, and computer-readable media are described herein by way of examples and embodiments, those skilled in the art recognize that methods, apparatuses, and computer-readable media for contextual data mining using a relational data set are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

The Applicant has discovered a way of contextual data mining using a relational data set. By utilizing a relational data set which can contain pre-existing indexes, relationships, and information which has been vetted in conjunction with information gathered from a variety of data sources, any new information which is discovered can be put in context and the ramifications of the new information can be properly analyzed in context and used.

Using the example of Human Geography (HG) data, a relational data set provides analysts with an understanding of the locations of prominent people and groups as well as cultural, demographic, and social network information about these people and groups. The geospatial and relational structure of these data sets allows analysts to visualize and analyze social networks geospatially. The relational data set can serve as the foundation to pull in other content through automated technologies by creating a structured, vetted base.

Additionally, automated systems can efficiently monitor change detection and update manually vetted relational data sets, creating a cycle in which the relational data set is both used to identify sources and to contextualize gathered data and in which the contextualized data is used to update the relational data set.

Figure 1:
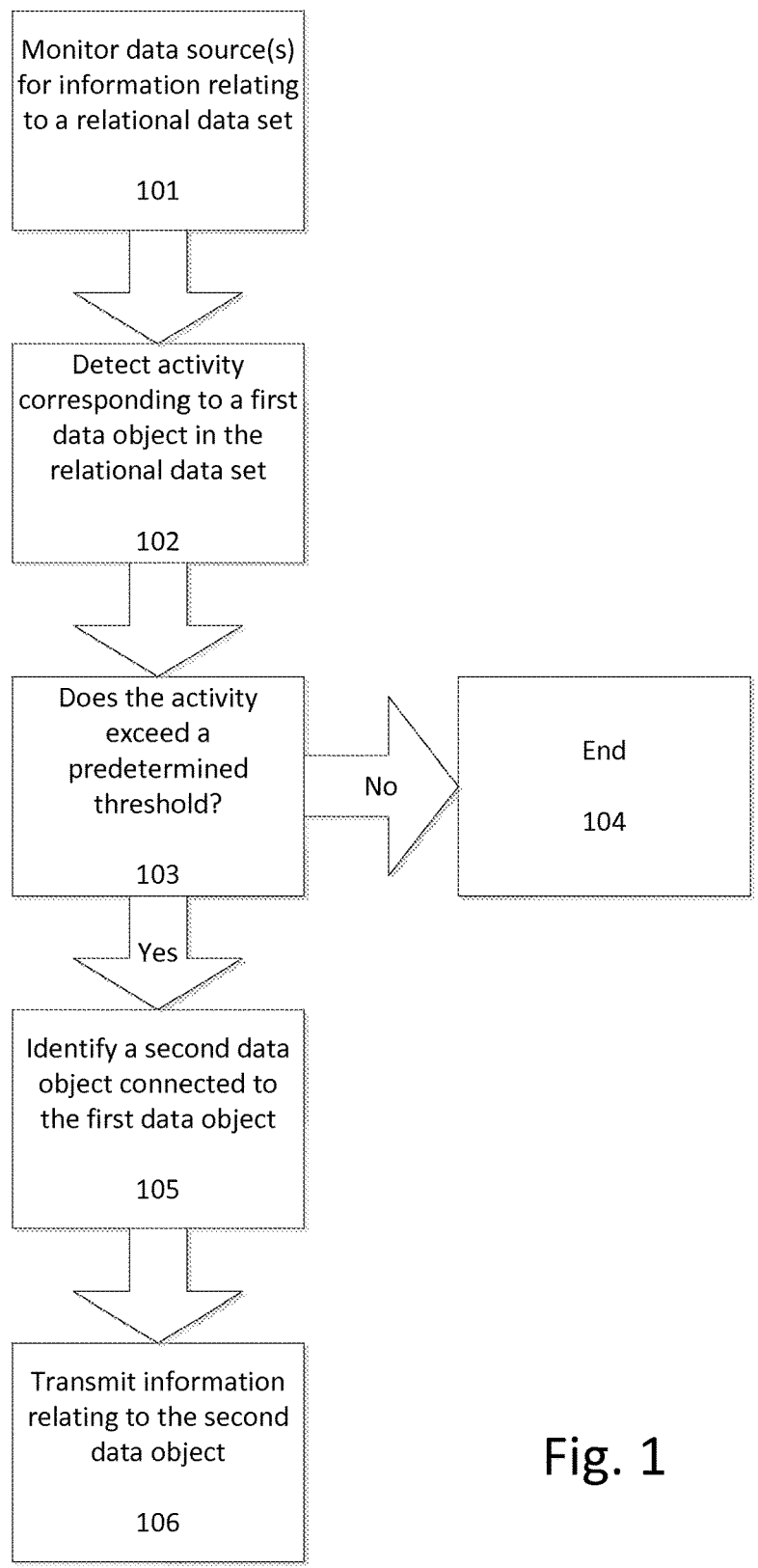
FIG. 1 illustrates a flowchart for contextual data mining using a relational data set according to an exemplary embodiment.

FIG. 1 is flowchart showing a method of contextual data mining using a relational data set according to an exemplary embodiment. At step 101, one or more data sources are monitored for information relating to a relational data set. The data sources can include both open sources, such as web pages, RSS feeds, blogs, social media, or public documents databases, and closed sources, such as governmental or NGO databases. Potential sources can be identified through web crawling, as well as by working with subject matter experts to validate sources for currency and accuracy. The format of the information monitored can be structured or unstructured, and can include a mix of hard copy and digital map and text sources. Optical character recognition (OCR) technologies can aid in the extraction of data from hard copy sources, and metadata repositories can hold discoverable descriptions of these sources. Expert analysts can also be used to aid in discovery and vetting of hard copy sources. Of course, data sources are not limited to English data sources, and can include a variety of different language sources which can be mined.

The relational data set includes one or more data objects in one or more classes and defines relationships between the one or more data objects in the one or more classes. For example, assuming that energy company A is based in the U.S. and operates an energy facility in country X, a HG relational data set can include objects and classes corresponding to relevant locations, names, relationships, hierarchies, etc., for country X, company A, their employees, and any other relevant entities. Additionally, the relational data set can include information in multiple languages so that any information which is detected can be analyzed independent of language. For example, data objects can store textual information for names in five different languages so that if that name is detected in any of those five languages, the appropriate foreign language versions of that name and any connections to that name can be identified. This allows for more confident matching in cases where the English translation or transliteration may have many permutations.

At step 102, activity corresponding to a data object in the relational data set is detected based at least in part on information gathered from at least one data source in the one or more data sources. Of course, the detected activity can also correspond to a plurality of data objects in the relational data set. Additionally, prior to detection, the information gathered from the one or more sources can be processed using natural language processing, string matching, or other forms of textual analysis or numerical analysis.

The activity corresponding to a data object(s) can be detected by identifying an association between information in the data received from a data source and information in the data object(s).

For example, activity relating to a person can be detected by identifying an association between a string in a document and the name of the person as stored in the data object for the person. In another example, a document received from a data source can mention location coordinates, and the location coordinates can be used to identify a relevant data object in the relational data set, such as a military installation data object, or a city data object.

Using the earlier example of company A, plural mentions of company A could be detected in connection with derogatory terms or threats to U.S. interests in country X. As a specific example, activity could be detected on the blog of person 1, in which the person 1 has urged others to "attack U.S. interests" in country X and which also mentions company A.

At step 103, a determination is made regarding whether the activity exceeds a predefined threshold. This is discussed in greater detail with regard to FIGS. 3-4, but can include an analysis of the content of the activity detected, the reliability of the data sources from which activity information was detected, the number of data sources from which the activity was detected, the data object(s) in the relational data set which the activity relates to, any data objects connected to those data objects, or any combination of these factors.

Using the earlier example in which person 1 makes a threat regarding company A, if person 1 is known to be a particularly dangerous individual with connections to violent organization XYZ (which can be determined through analysis of the relational data set), then the activity can be deemed to exceed the threshold. This analysis can be carried out using appropriate numerical measures and calculations. For example, if the quantity of violent incidents which are connected to organization XYZ is greater than a predetermined number then that organization can be deemed a violent organization. Additionally, if the number of times activity by person 1 has resulted in violent incidents tied to organization XYZ exceeds a predetermined number, then person 1 can be considered to have influence or ties to organization XYZ. Some or all of these determinations can be used to decide that the activity by person 1 of threatening company A exceeds a predetermined threshold.

If the activity corresponding to the data object(s) does not exceed a predetermined threshold, then the method can end, as indicated at step 104. If the activity corresponding to the data object(s) does exceed a predetermined threshold, then at step 105, any second data object(s) in the relational data set which are connected to that data object (or which are connected to the multiple data objects) can be identified. This identification can be based on analysis of the relationships between the one or more objects in the relational data set.

Using the earlier HG example of person 1, this step can involve determining whether there are any relationships, directly or indirectly, between person 1, who made the threat, and the energy facility operated by company A. For example, the relational data set can indicate that person 1 is a member of tribe T and that several support personnel assigned to the energy facility are also members of tribe T. The relational data set can also tell us the level of influence that person 1 has over members of Tribe T based on level of influence data described in U.S. patent application Ser. No. 13/493,390 filed Jun. 11, 2012 and titled "METHOD, APPARATUS, AND COMPUTER-READABLE MEDIUM FOR THE DETERMINATION OF LEVELS OF INFLUENCE OF A GROUP," the disclosure of which is incorporated herein by reference. Accordingly, using the relational data set, any data objects in the relational data set which are connected to person 1 and which are connected to the energy facility can be identified.

At step 106, information relating to the second data object(s) can be transmitted based at least in part on a determination that the activity exceeds a predetermined threshold. This can include transmitting the information to a display, such as in an alarm, a chart, or other display mechanism. The can also include transmitting the information electronically, such as in an email, a text message, or other communication. The information relating to the second data object(s) can also include information regarding how the second data object is pertinent to the activity corresponding to the first data object. In the above example of the threat to an energy facility, an electronic message can be sent to a defense contractor responsible for the safety of the energy facility and can identify the members of Tribe T that are support personal at the energy facility and indicate that a threat has been made by a member of Tribe T related to the energy facility.

The information relating to the second data object(s) can also include geospatial data, such as specific coordinates, clear Points of Interest (POIs), and locations for prominent individuals and groups. These locations and areas can be represented in a geospatial format using polygons or other suitable representations. The format of the geospatial data can be Geographic Information System (GIS) format so that visualizing or disseminating the data is easily possible. Additionally, the geospatial data can be converted to any suitable format prior to transmission, such as geodatabase, shapefiles, XML, or web-based formats.

Figure 2:
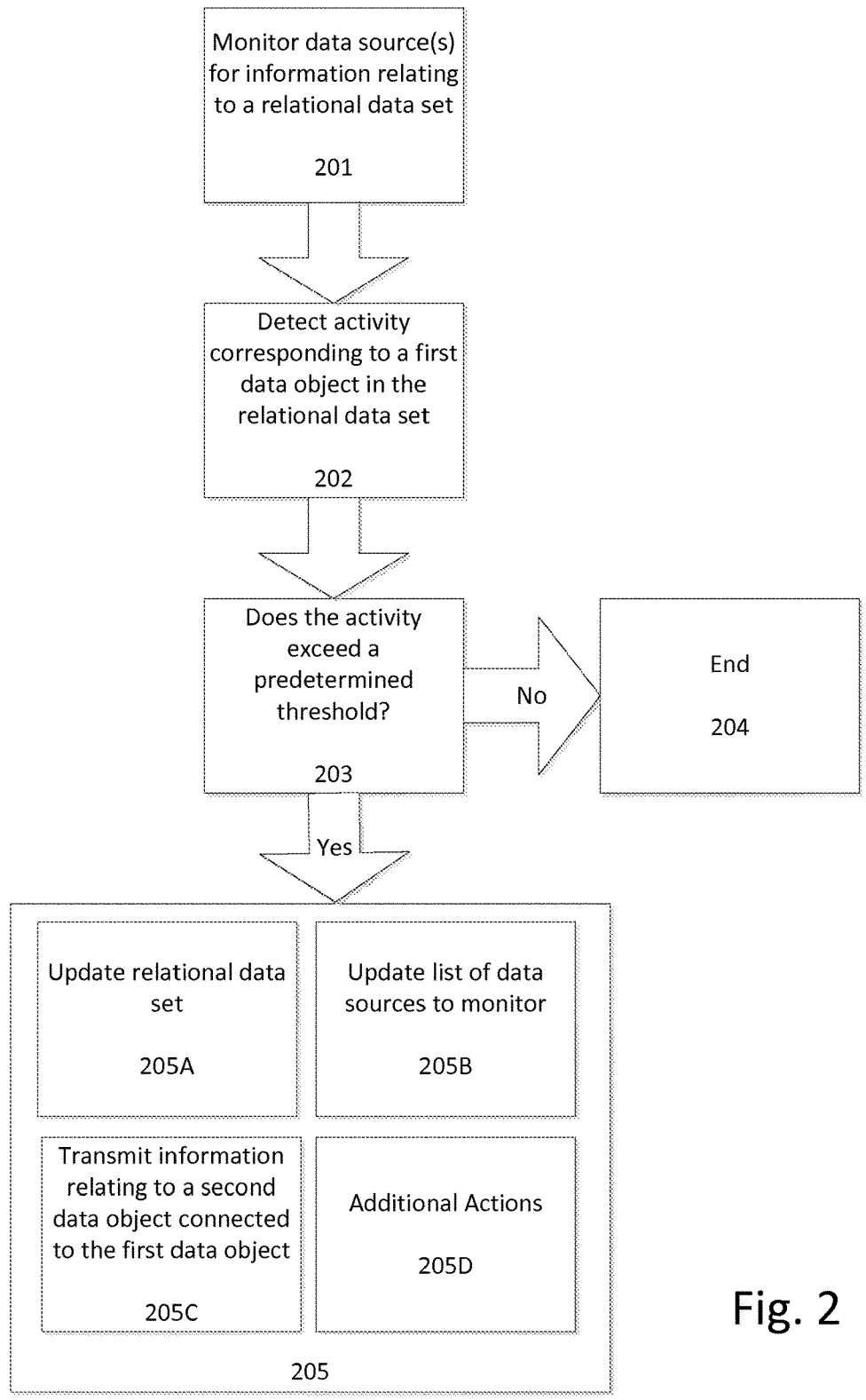
FIG. 2 illustrates another flowchart for contextual data mining using a relational data set according to an exemplary embodiment.

FIG. 2 is flowchart showing a method of contextual data mining using a relational data set according to an exemplary embodiment. Steps 201-204 are similar to steps 101-104 of FIG. 1. At step 201, one or more data sources are monitored for information relating to the relational data, wherein the relational data set comprises one or more data objects in one or more classes and defines relationships between the one or more data objects in the one or more classes. At step 202, activity corresponding to one or more first data objects in the one or more data objects is detected based at least in part on information gathered from at least one data source in the one or more data sources in the relational data set. At step 203, a determination is made regarding whether the activity exceeds a predefined threshold, and at step 204 the method can end if the activity does not exceed the predefined threshold. All of these steps can be carried out similar to steps 101-104 of the flowchart of FIG. 1, with the corresponding variations and features.

If the activity exceeds a predefined threshold, then at step 205, one or more of the sub-steps 205A-205D can be performed. At step 205A, the relational data set can be updated based on the activity information. The update can be applied to one or more second data objects connected to the one or more first data objects, and the one or more second data objects can be identified using the relational data set, as described earlier. The update can also be applied to one or more of the first data objects which the activity corresponds to. For example, the new activity can include information indicating that person B is a member of tribe Y. If the relational data set did not previously reflect this information, then the data object for person B and/or the data object for tribe Y can be updated to reflect this new information.

At step 205B, the list of data sources to monitor can be updated based on the activity corresponding to one or more first data objects in the relational data set. For example, the activity can indicate that person C in criminal organization K has ties to state Indiana. The list of data sources to monitor for the relational data set can then be updated to include Indiana state publications, including local newspapers and other online content. An analysis can also be done to determine the level of influence of person C among criminal organization K prior to updating the data sources.

At step 205C, information relating to one or more second data objects connected to the one or more first data objects can be transmitted. This step can include the same features and have the same variations as step 106 of the flowchart in FIG. 1. Additionally, as discussed earlier, the one or more second data objects can be identified using the relational data set, as is described in step 105 of the flowchart of FIG. 1.

At step 205D, one or more additional actions can be performed. These can include converting activity information into another format for export, visualizing activity information or other information in the relational data set, predictive analysis, and/or manual vetting or analysis of activity data.

Figure 3:
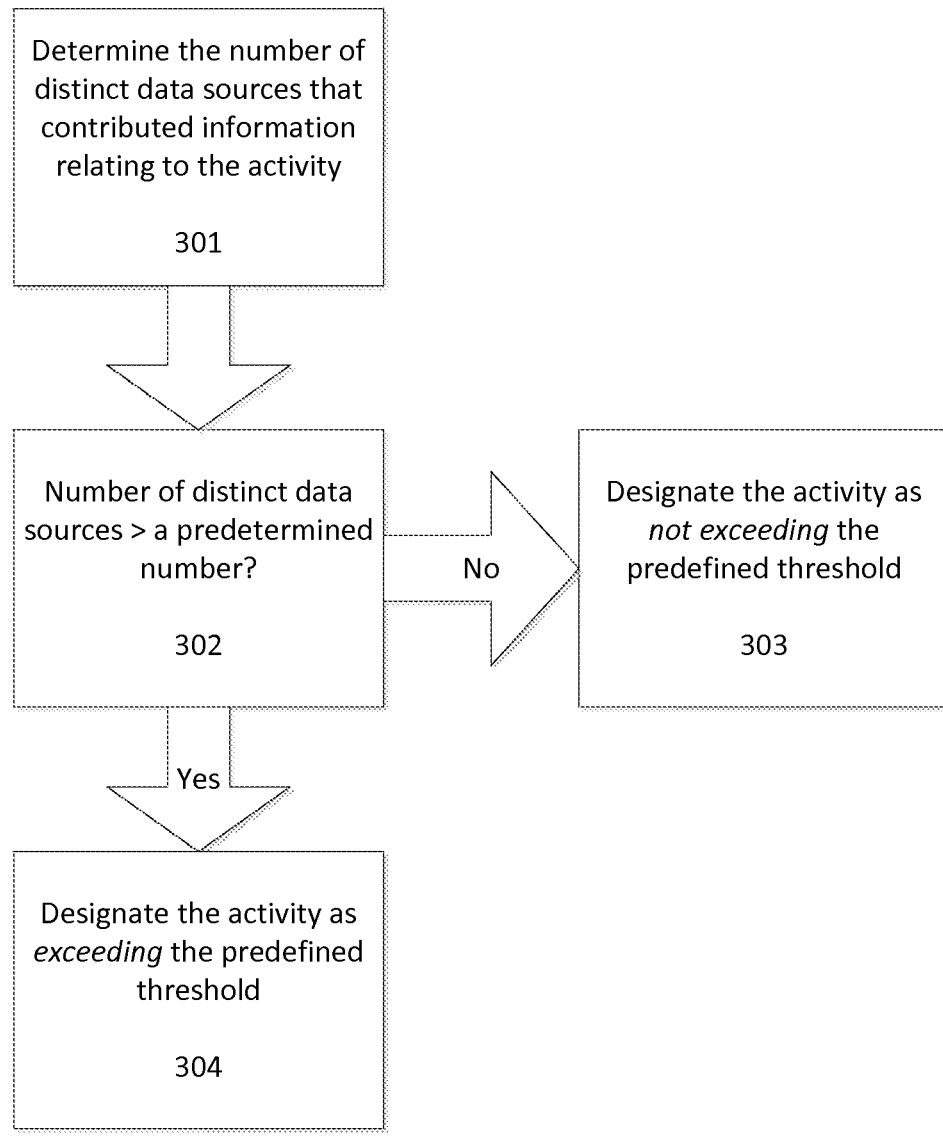
FIG. 3 illustrates a flowchart for determining whether detected activity exceeds a predetermined threshold according to an exemplary embodiment.

FIG. 3 is flowchart showing a method of determining whether an activity exceeds a predefined threshold according to an exemplary embodiment. As discussed earlier, an activity corresponding to a first data object (or first data objects) is detected based at least in part on information gathered from at least one data source in the one or more data sources. The at least one data source can in many cases be multiple data sources. For example, multiple news outlets could release information pertaining to the same activity. At step 301, a determination is made regarding the number of distinct data sources that contributed information relating to the activity. This determination can assess whether any or all of the information related to the activity was provided by each distinct data source and then count the number of distinct data sources which contributed to the activity.

At step 302 a determination is made regarding whether the number of distinct data source is greater than a predetermined number. This number can be considered to be a reliability threshold and can be automatically determined or entered by a user. The reliability threshold can also be configured to depend on the activity information. For example, if the activity is considered unlikely, based on analysis of the data objects in the relational data set and the activity details, then the reliability threshold can be set high. On the other hand, if the activity is considered likely, based on analysis of the data objects in the relational data set and the activity details, then the reliability threshold can be set low.

At step 303, the activity is designated as not exceeding the predefined threshold if the number of distinct data sources is not greater than the predetermined number. At step 304, the activity is designated as exceeding the predefined threshold if the number of distinct data sources is greater than the predetermined number.

Figure 4:
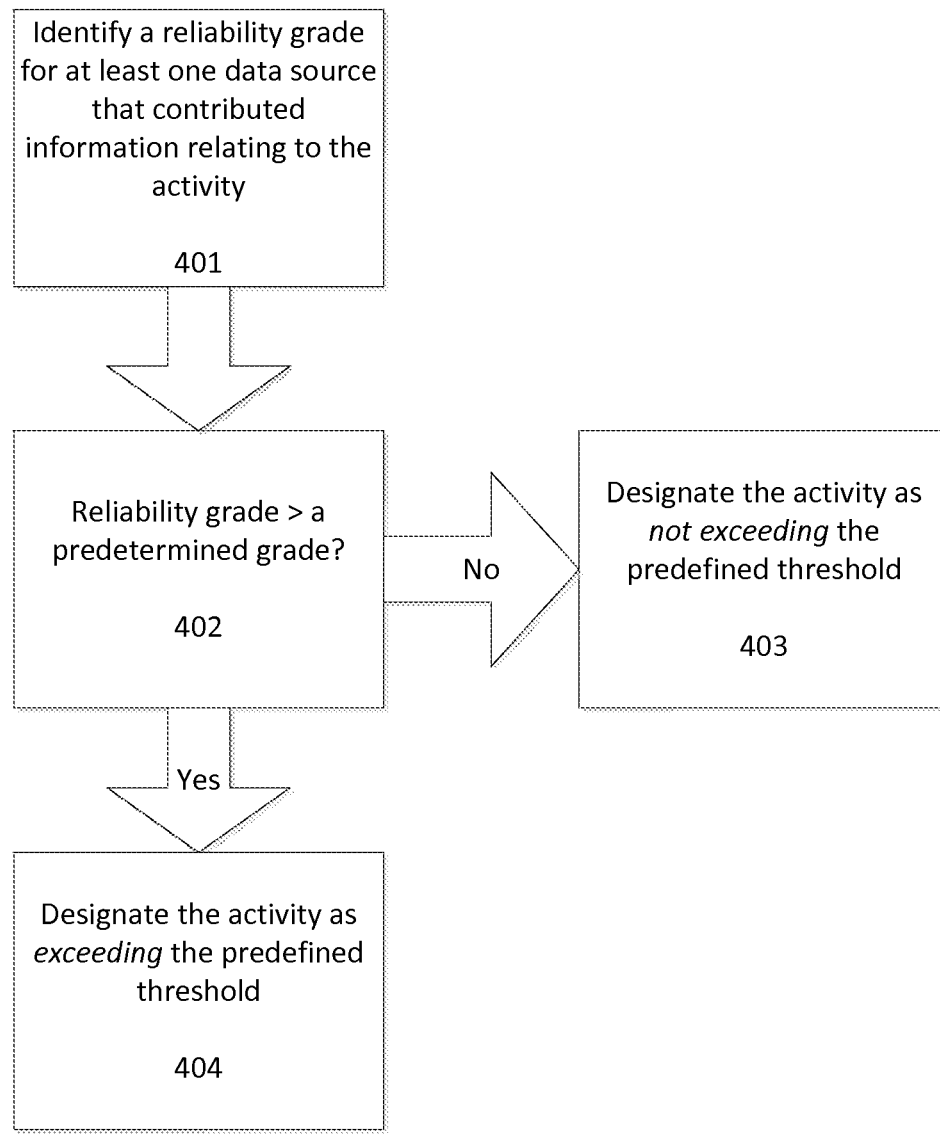
FIG. 4 illustrates another flowchart for determining whether detected activity exceeds a predetermined threshold according to an exemplary embodiment.

FIG. 4 is flowchart showing a method of determining whether an activity exceeds a predefined threshold according to an exemplary embodiment. At step 401, a reliability grade is identified for at least one source that contributed to the detected activity. The reliability grade can be calculated automatically, and can be based on the reliability of past information provided by each data source. Alternatively, the reliability grade can be assigned based on expert recommendations or other forms of vetting. Scorecards can be maintained to help determine reliability of sources and extracted data. These scores can be determined using a combination of factors such as currency, reliability of publisher, and geospatial scale, to name a few. This scorecard can be especially important when applied to web based sources that can contain a much wider range of accuracy than peer-reviewed sources.

At step 402 a determination is made regarding whether the reliability grade is greater than a predetermined reliability grade. The predetermined reliability grade can be automatically determined or entered by a user. The predetermined reliability grade can also be configured to depend on the activity information. For example, if the activity is considered unlikely, based on analysis of the data objects in the relational data set and the activity details, then the predetermined reliability grade can be set high. On the other hand, if the activity is considered likely, based on analysis of the data objects in the relational data set and the activity details, then the predetermined reliability grade can be set low.

At step 403, the activity is designated as not exceeding the predefined threshold if the reliability grade is not greater than the predetermined reliability grade. At step 404, the activity is designated as exceeding the predefined threshold if the reliability grade is greater than the predetermined reliability grade.

Of course, the methods described in FIGS. 3-4 can be combined and the reliability grade of each data source can be used in conjunction with the reliability threshold pertaining to the number of distinct data sources that contribute to a detected activity. The earlier described scorecard can be used to maintain an understanding of the reliability of data once multiple sources are aggregated.

Figure 5:
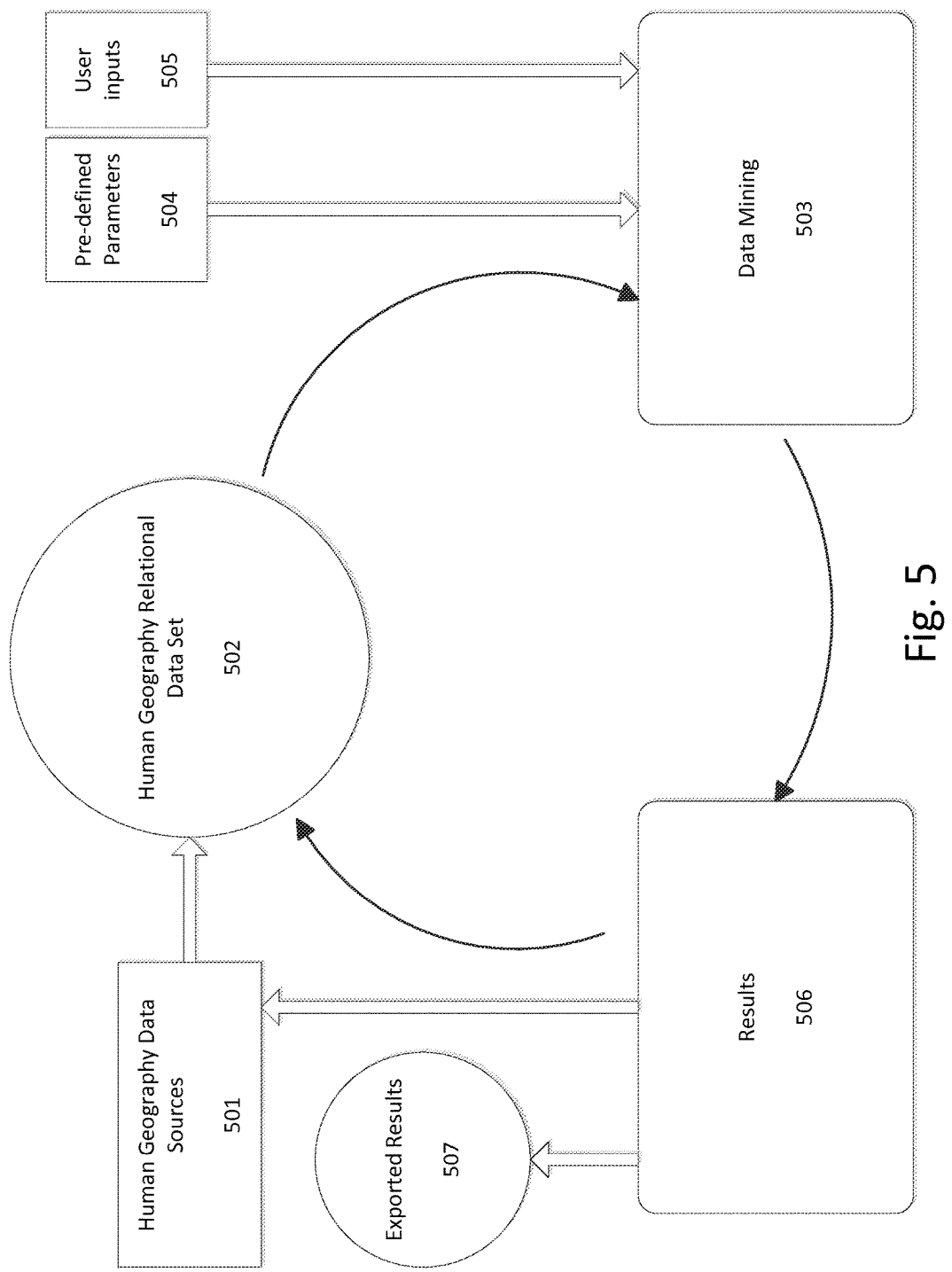
FIG. 5 illustrates a process flow diagram of the contextual data mining system according to an exemplary embodiment.

As discussed earlier, the relational data set can be a human geography (HG) data set. FIG. 5 illustrates a process flow diagram for contextual data mining using an HG relational data set according to an exemplary embodiment. As shown in the figure, HG data sources 501 are used to develop the HG relational data set 502, such as the Human Atlas® from Geographic Services Inc. (GSI). The HG relational data set 502 can include the locations of prominent people and groups, places, names, hierarchies, relationships, as well as cultural, demographic, and social network information about these people and groups. The geospatial and relational structure of these data sets also allows analysts to visualize and analyze social networks geospatially.

The HG relational data set 502 can serve as a vetted foundation of HG data which enables automation of data mining 503. For example, this data can serve as the foundation to pull in other content through automated technologies by creating the structured, vetted base. Equally, automated systems can efficiently monitor change detection and update manually vetted data sets, creating a virtuous cycle.

With human geography, correctly identifying names requires knowledge of the culture and language of the target country. The HG relation data set provides an existing network of information that already contains these match terms. Names in the data set are captured in both English and native languages allowing engines to search beyond English websites and sources. The vetted network also provides structured context for data mining. The social linkages, hierarchical structures, and locations all provide vetted context for analysis. These vetted networks also allow engines to cast a wider search net. For example, if an analyst is interested in learning more about a specific individual, they can deploy data mining engines to search content related to not only the specific individual, but also other individuals in the same location or within the same social hierarchy structure (i.e., clan, gang, or political group). Additionally, this vetted network provides cultural context for naming conventions. Surname conventions vary with culture and add difficulty to automated searching. For example, an individual with an Arabic name may not take his or her family name as a preferred surname, but instead go by another name in the hierarchy. Two brothers may have different last names, but both surnames will be derived from a name in their social hierarchy for example, family, clan, tribe, and confederation. This is present in other cultures as well, for example, in traditional Spanish naming convention people are referred to by given name, followed by patronym and then matronym. This may be truncated to only the first surname, or reversed in more modern examples. By understanding an individual's hierarchical connections, insight can be gained into the additional names that they may use as reference. Anwar Al Awlaki is a prime example of this for Arabic naming. His family name of "Farid" was replaced by the name of the highest level of his tribal hierarchy, or confederation.

FIG. 5 shows how the HG relational data set 502 can be fed into a data mining process 503 to help the engine more intelligently search through large volumes of open source and closed source data stores. The data mining process 503 can receive user inputs 505 and predefined parameters 504, such as lexicons, mining rules, search terms, and the like.

The data mining process 503 can involve a variety of analytics and language analysis, as well as data discovery, and the results 506 can then be tied back to the foundational HG relational data set 502 in a continual update cycle. New attributes and advanced analysis (e.g., sentiment, level of influence) can be tied to existing data. Newly discovered sources can be added to the HG data sources 501 and can then be used to expand the data and to update existing data.

Turning to FIGS. 6A-6J, the structure and features of the HG data in an HG relational data set will be described. The HG relational data set described in these figures corresponds to the South Kivu Province of the Democratic Republic of Congo, but this is provided as an example only, and the HG relational data could correspond to a variety of possible HG terrains, locales, countries, cities, or other geographic areas.

The HG relational data set for the South Kivu Province of the Democratic Republic of Congo provides tribal hierarchy data in a geospatial format and identifies approximate locations for specific tribes as well as their tribal hierarchies. In addition to the Human Geography data, this database contains geographic names, armed groups, mining areas, confrontations, and human rights abuses.

Figure 6A:
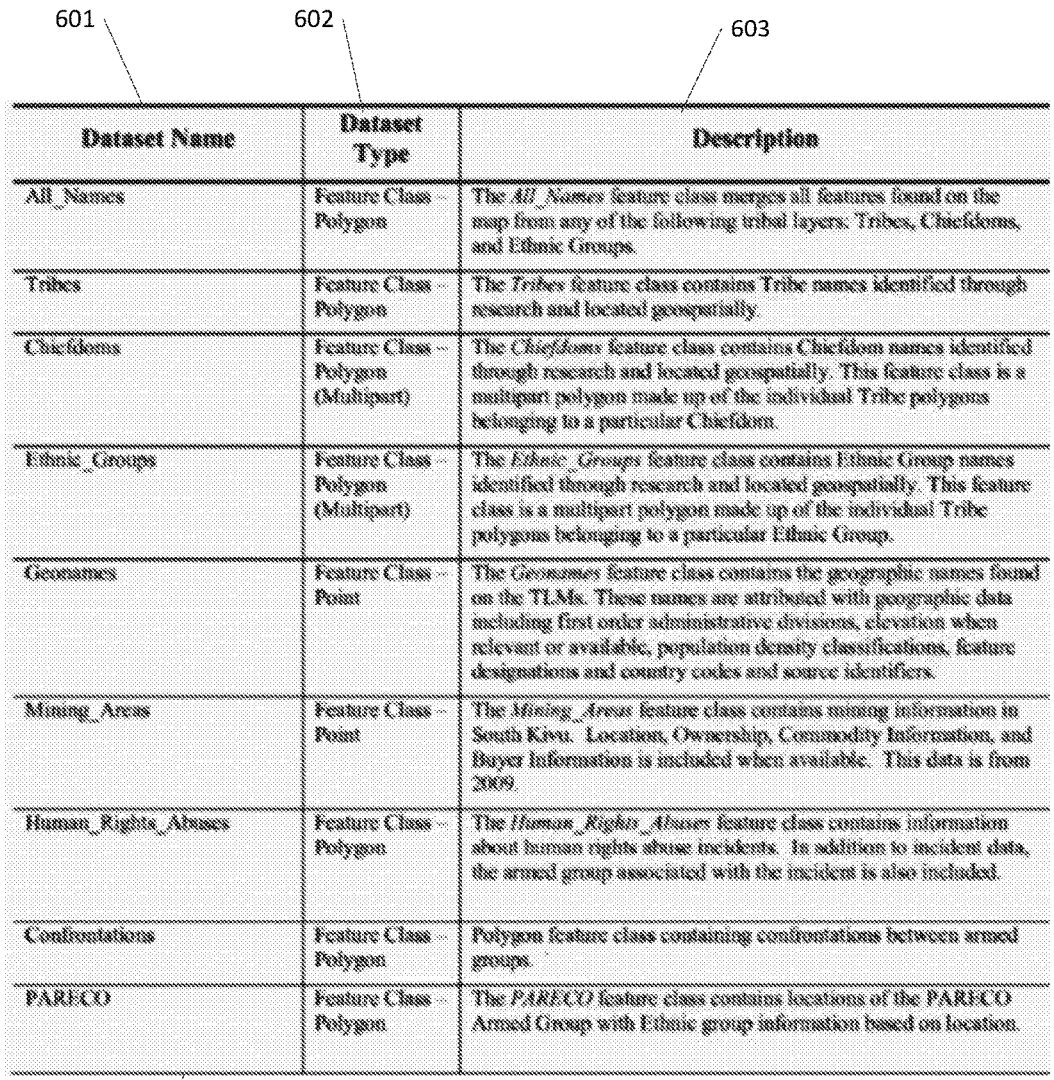

Turning to FIG. 6A, the first part 600A of a geodatabase in the HG relational data set is shown. The geodatabase includes the name of each dataset 601 in the geodatabase, the dataset type 602, and a description of each dataset 603. As shown, the dataset types can include spatial data types such as polygons, multi-part polygons, points, and the like. For example, the "Tribes" class contains Tribe names identified through research and located geospatially and is represented with polygons as an area on a map.

FIG. 6B shows the second part 600B of the geodatabase. As shown in the figure, the geodatabase includes hierarchical relationship classes which define hierarchical relationships between one or more classes in the relational data set. For example, the CHIEFDOM TRIBE relationship class defines the hierarchies between the Chiefdoms class and the Tribes class.

Figure 6C:
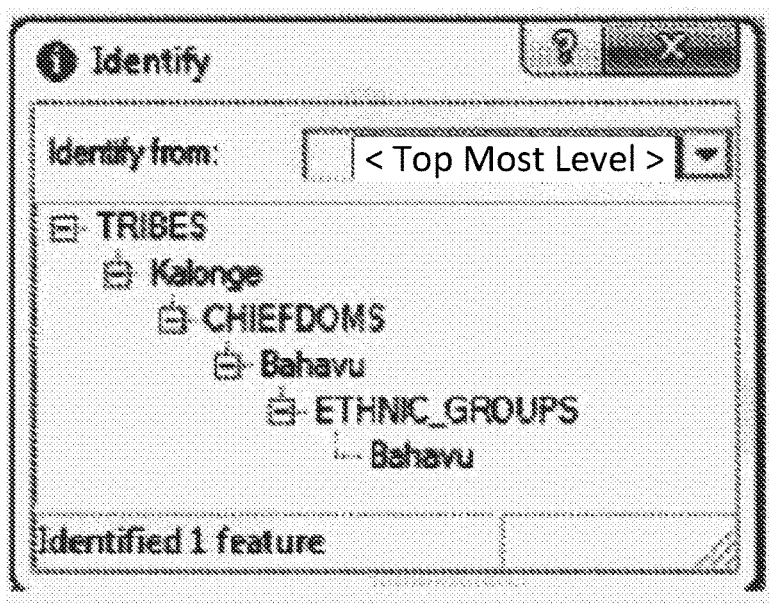

In this example of an HG relational data set, there are three tribal hierarchy feature classes: Tribes, Chiefdoms, and Ethnic Groups. FIG. 6C shows how the relationship classes allow a user to view the hierarchical data in a user interface 604. Relationship classes provide users the ability to connect information contained in disparate database containers such as Feature Classes and Tables and visualize them. The relationship classes in this HG relational data set link the tribal hierarchy levels. These relationships are simple peer-to-peer relationships and propagate forward from origin to destination. The higher level in the hierarchy acts as the KEY field. For example, the Ethnic Group to Chiefdom relationship class has Ethnic Group as the KEY field. The two relationship classes can provide the hierarchical view of the HG layers in a user interface. After the relationship classes are added to the map and a polygon is identified, the user can expand an Ethnic Group to see its affiliated Chiefdoms. A Chiefdom can then be expanded to navigate through Tribes in a Chiefdom.

The HG relational data set can include a geographic names database which includes named features and a village shapefile. The geographic names database and the village shapefile can be used to update geographic areas. FIGS. 6D-6F illustrate the first 605A, second 605B, and third 605C parts of a table listing the attributes for named features and their related descriptions. For example, the designation (DSG) code shown in FIG. 6E represents the type of geographic feature identified. For example, the DSG "PPL" refers to a populated place, while the DSG "HLL" refers to a hill.

The HG relational data set can include multiple layers, each of which corresponds to a feature class and which can be viewed in a geospatial format either alone, in different combinations with other layers, or in a combined multilayer containing all of the layers.

For example, the HG relational data set can include a layer containing human rights abuse incidents. Incidents include a description as well as information about the location, date, as well as the perpetrator of the abuse. Incidents in this feature class can optionally not contain spatial representations. This can mean that the location identified through research either via book or open source could be not verified with another geospatial source.

The HG relational data set can include a layer containing confrontations between armed groups. Incidents can include a description as well as information about the location, date, and the parties involved in the confrontation. Confrontations in this feature class can optionally not contain spatial representations. This can mean that the location identified through research either via book or open source could be not verified with another geospatial source.

FIG. 6G shows a table 606 containing the attributes and related descriptions for a Mining Areas layer. This layer can include information about the mining operation itself as well as armed group activity at the mine.

The HG relational data set can also include one or more armed group layers. FIG. 6H shows a table 607 containing Armed Group Attributes and Descriptions for each armed group layer. In this example, the database contains a total of five armed group layers that display the locations and other information about each armed group in South Kivu. These layers are called FARDC, FDLR, FRF, Rasta, and PARECO, corresponding to the identities of each of the armed groups in South Kivu.

As discussed earlier, all of the layers in the HG relational data set can be combined into a single combined layer. This layer can be a polygon feature class that combines all of the Human Geography layers including Tribes, Chiefdoms, and Ethnic Groups. Because this layer contains all of the HG information, an analyst could simply use this layer in their analysis. The polygons are drawn to the approximate location of the tribal groups. FIG. 6I shows a table 608 with the attributes and descriptions for the single combined layer.

Figure 6J:
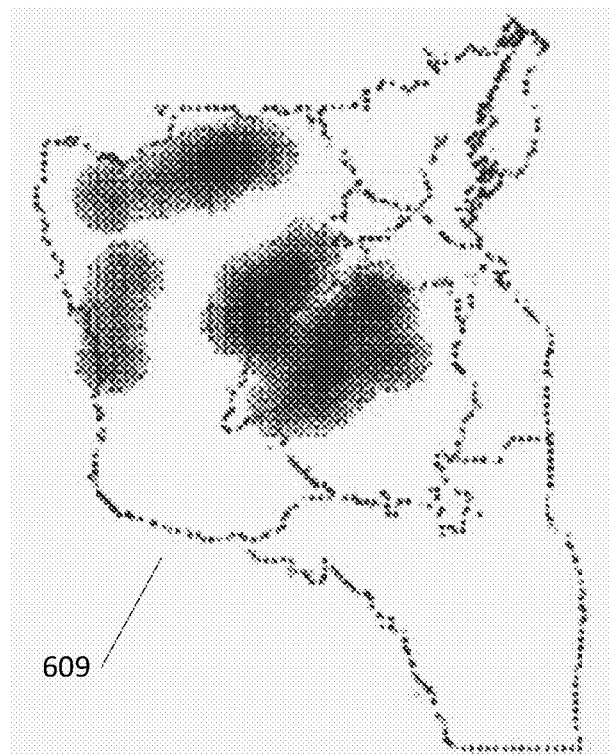

As an example of a visualization available through the HG relational data set, Raster Layers can be used for the Ethnic Groups in South Kivu. These rasters, or "heat maps", show the relative concentrations of each ethnic group across the province. These density maps can be completed based upon the number of features in the dataset rather than population information. The more features for a particular group in the dataset in a specific location, the higher the density. FIG. 6J illustrates an Ethnic Group Heat Map 609 of the Barega Ethnic Group which allows the user to quickly visualize regional tribal domains without overgeneralization. This Heat Map 609 is not population-based and should not be construed as demonstrating population densities. This visualization and any others described in the relational data set can be used to transmit or output results of the data mining process described earlier.

By using the relational data set such as the one described in FIGS. 6A-6J, information gathered through data mining of data sources can be put into context and used to both identify relationships of data objects in the relational data set to an activity and to transmit information regarding the activity and/or the data objects.

For example, the one or more classes in the relational data set can include a parent social group class representing a parent social group which includes an object defined as a first area on a map. If the information in the data received from at least one of the one or more data sources being mined relates to an event, an association can be identified between a parent social group object and the event by determining whether the event occurred in the first area.

Additionally, if a second data object in the relational data set is a person data object and the relational data set indicates that the person data object is a member of the parent social group, then the person data object can be identified as being connected to the parent social group object and indirectly connected to the event. Of course, this example is provided for illustration only, and is not intended to be limiting. In another example, the first data object which the detected activity pertains to can be a commodity data object and the second data object connected to that first data object can be a social group data object, such as a group that controls a particular mine.

Figure 7:
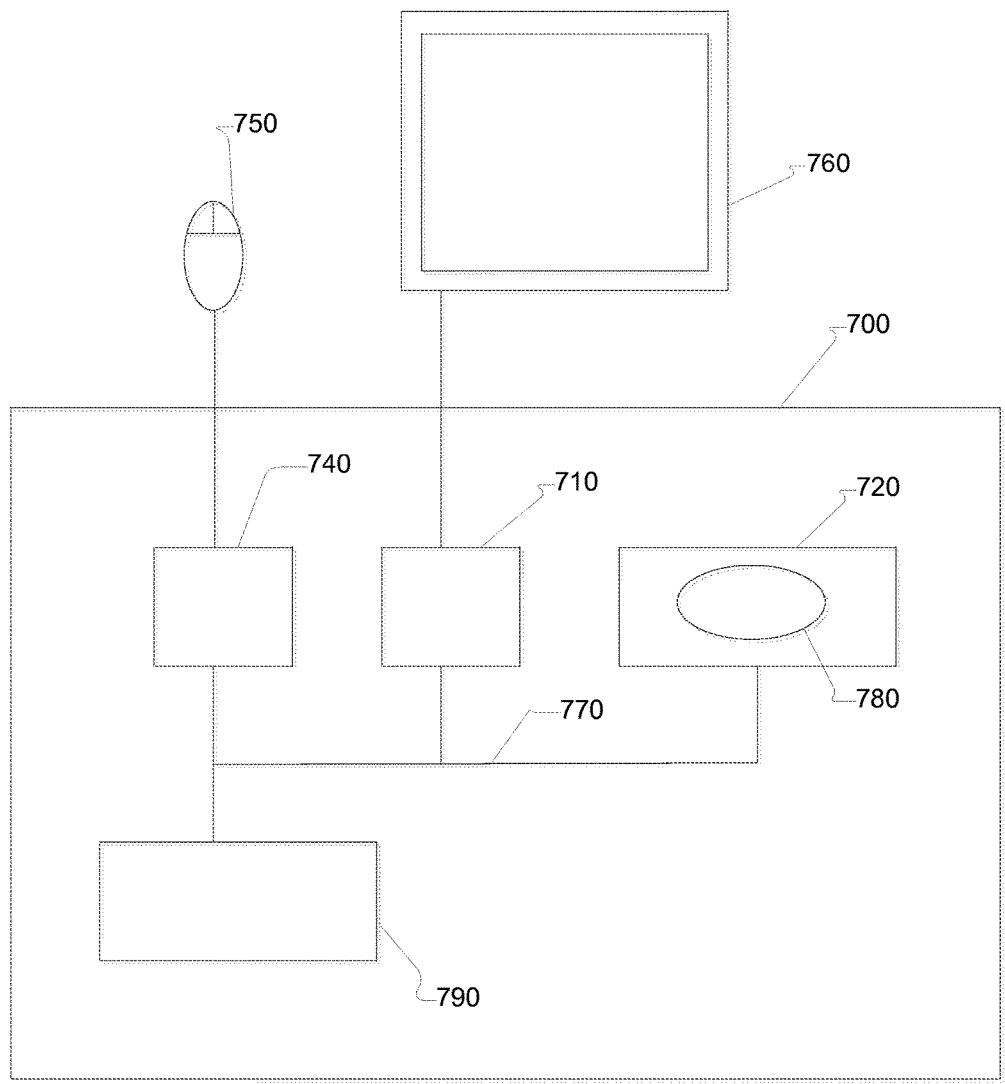
FIG. 7 illustrates an exemplary computing environment that can be used to carry out the method for contextual data mining using a relational data set according to an exemplary embodiment.

One or more of the above-described techniques can be implemented in or involve one or more computer systems. FIG. 7 illustrates a generalized example of a computing environment 700. The computing environment 700 is not intended to suggest any limitation as to scope of use or functionality of a described embodiment.

With reference to FIG. 7, the computing environment 700 includes at least one processing unit 710 and memory 720. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 may store software instructions 780 for implementing the described techniques when executed by one or more processors. Memory 720 can be one memory device or multiple memory devices.

A computing environment may have additional features. For example, the computing environment 700 includes storage 740, one or more input devices 750, one or more output devices 760, and one or more communication connections 790. An interconnection mechanism 770, such as a bus, controller, or network interconnects the components of the computing environment 700. Typically, operating system software or firmware (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 may store instructions for the software 780.

The input device(s) 750 may be a touch input device such as a keyboard, mouse, pen, trackball, touch screen, or game controller, a voice input device, a scanning device, a digital camera, remote control, or another device that provides input to the computing environment 700. The output device(s) 760 may be a display, television, monitor, printer, speaker, or another device that provides output from the computing environment 700.

The communication connection(s) 790 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 700, computer-readable media include memory 720, storage 740, communication media, and combinations of any of the above.

Of course, FIG. 7 illustrates computing environment 700, display device 760, and input device 750 as separate devices for ease of identification only. Computing environment 700, display device 760, and input device 750 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 700 may be a set-top box, mobile device, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices for contextual data mining using a relational data set, the method comprising:
   monitoring, by at least one of the one or more computing devices, one or more data sources external to the relational data set for information relating to the relational data set, wherein the relational data set comprises one or more data objects in one or more classes and defines relationships between the one or more data objects in the one or more classes;
   detecting, by at least one of the one or more computing devices, activity corresponding to a first data object in the one or more data objects of the relational data set by identifying an association between information gathered from at least one data source external to the relational data set in the one or more data sources external to the relational data set and information in the first data object, wherein the activity corresponding to the first data object is determined based at least in part on the information gathered from the at least one data source external to the relational data set;
   determining, by at least one of the one or more computing devices, whether the activity corresponding to the first data object exceeds a predefined threshold;
   identifying, by at least one of the one or more computing devices, a second data object in the one or more data objects of the relational data set which is connected to the first data object based at least in part on an analysis of the relationships between the one or more data objects of the relational data set; and
   monitoring, by at least one of the one or more computing devices, one or more additional data sources external to the relational data set and associated with the second data object based at least in part on a determination that the activity exceeds the predefined threshold.

2. The method of claim 1, wherein the relational data set comprises vetted data.

3. The method of claim 1, further comprising updating the second data object based at least in part on a determination that the activity exceeds the predefined threshold.

4. The method of claim 1 further comprising:
   transmitting, by at least one of the one or more computing devices, information relating to the second data object based at least in part on a determination that the activity corresponding to the first data object exceeds the predefined threshold.

5. The method of claim 1, wherein the one or more data sources external to the relational data set comprise a plurality of data sources external to the relational data set and wherein determining whether the activity exceeds a predefined threshold comprises:
   determining how many distinct data sources in the plurality of data sources external to the relational data set contributed information relating to the activity; and
   designating the activity as exceeding the predefined threshold based at least in part on a determination that the number of distinct data sources is greater than a predetermined number.

6. The method of claim 1, wherein determining whether the activity exceeds a predefined threshold comprises:
   identifying a reliability grade for the at least one data source external to the relational data set in the one or more data sources external to the relational data set; and
   designating the activity as exceeding the predefined threshold based at least in part on a determination that the reliability grade is greater than a predetermined reliability grade.

7. The method of claim 1, wherein the one or more additional sources external to the relational data set and associated with the second data object comprise one or more sources associated with a geographic location which is also associated with the second data object.

8. The method of claim 1, wherein the relational data set is a human geography data set and includes a hierarchical relationship class which defines hierarchical relationships between the one or more classes.

9. The method of claim 8, wherein the one or more classes include a parent social group class representing a parent social group which is defined as a first area on a map.

10. The method of claim 9, wherein the information gathered from the at least one data source external to the relational data set relates to an event, the first data object is a data object in the parent social group class, and wherein identifying an association comprises:
   determining whether the event occurred in a geographic area that is within the first area.

11. The method of claim 10, wherein the second data object comprises a person data object corresponding to a person that is part of the parent social group.

12. The method of claim 1, wherein the first data object corresponds to a geographic area and the second data object corresponds to a person.

13. The method of claim 1, wherein the first data object corresponds to a commodity and the second data object corresponds to a social group.

14. The method of claim 4, wherein the information relating to the second data object comprises at least one of an alarm, a notification, a chart, or information regarding how the second data object is pertinent to the activity corresponding to the first data object.

15. An apparatus for contextual data mining using a relational data set, the system comprising:
   one or more hardware processors; and
   one or more memories operatively coupled to at least one of the one or more hardware processors and having instructions stored thereon that, when executed by at least one of the one or more hardware processors, cause at least one of the one or more hardware processors to:
      monitor one or more data sources external to the relational data set for information relating to the relational data set, wherein the relational data set comprises one or more data objects in one or more classes and defines relationships between the one or more data objects in the one or more classes;
      detect activity corresponding to a first data object in the one or more data objects of the relational data set by identifying an association between information gathered from at least one data source external to the relational data set in the one or more data sources external to the relational data set and information in the first data object, wherein the activity corresponding to the first data object is determined based at least in part on the information gathered from the at least one data source external to the relational data set;
      determine whether the activity corresponding to the first data object exceeds a predefined threshold;
      identify a second data object in the one or more data objects of the relational data set which is connected to the first data object based at least in part on an analysis of the relationships between the one or more data objects of the relational data set; and
      monitor one or more additional data sources external to the relational data set and associated with the second data object based at least in part on a determination that the activity exceeds the predefined threshold.

16. The apparatus of claim 15, wherein the relational data set comprises vetted data.

17. The apparatus of claim 15, wherein at least one of the one or more memories has further instructions stored thereon that, when executed by at least one of the one or more hardware processors, cause at least one of the one or more hardware processors to update the second data object based at least in part on a determination that the activity exceeds the predefined threshold.

18. The apparatus of claim 15, wherein at least one of the one or more memories has further instructions stored thereon that, when executed by at least one of the one or more hardware processors, cause at least one of the one or more hardware processors to:
   transmit information relating to the second data object based at least in part on a determination that the activity corresponding to the first data object exceeds the predefined threshold.

19. The apparatus of claim 15, wherein the one or more data sources external to the relational data set and comprise a plurality of data sources external to the relational data set and wherein the instructions that, when executed by at least one of the one or more hardware processors, cause at least one of the one or more hardware processors to determine whether the activity exceeds a predefined threshold further cause at least one of the one or more hardware processors to:
   determine how many distinct data sources in the plurality of data sources external to the relational data set and contributed information relating to the activity; and
   designate the activity as exceeding the predefined threshold based at least in part on a determination that the number of distinct data sources is greater than a predetermined number.

20. The apparatus of claim 15, wherein the instructions that, when executed by at least one of the one or more hardware processors, cause at least one of the one or more hardware processors to determine whether the activity exceeds a predefined threshold further cause at least one of the one or more hardware processors to:
   identify a reliability grade for the at least one data source external to the relational data set in the one or more data sources external to the relational data set; and
   designate the activity as exceeding the predefined threshold based at least in part on a determination that the reliability grade is greater than a predetermined reliability grade.

21. The apparatus of claim 15, and wherein the one or more additional sources external to the relational data set and associated with the second data object comprise one or more sources associated with a geographic location which is also associated with the second data object.

22. The apparatus of claim 15, wherein the relational data set is a human geography data set and includes a hierarchical relationship class which defines hierarchical relationships between the one or more classes.

23. The apparatus of claim 22, wherein the one or more classes include a parent social group class representing a parent social group which is defined as a first area on a map.

24. The apparatus of claim 23, wherein the information gathered from the at least one data source external to the relational data set relates to an event, the first data object is a data object in the parent social group class, and wherein the instructions that, when executed by at least one of the one or more hardware processors, cause at least one of the one or more hardware processors to identify an association further cause at least one of the one or more hardware processors to determine whether the event occurred in a geographic area that is within the first area.

25. The apparatus of claim 24, wherein the second data object comprises a person data object corresponding to a person that is part of the parent social group.

26. The apparatus of claim 15, wherein the first data object corresponds to a geographic area and the second data object corresponds to a person.

27. The apparatus of claim 15, wherein the first data object corresponds to a commodity and the second data object corresponds to a social group.

28. The apparatus of claim 18, wherein the information relating to the second data object comprises at least one of an alarm, a notification, a chart, or information regarding how the second data object is pertinent to the activity corresponding to the first data object.

29. At least one non-transitory computer-readable medium storing computer-readable instructions that, when executed by one or more computing devices, cause at least one of the one or more computing devices to:
monitor one or more data sources external to a relational data set for information relating to the relational data set, wherein the relational data set comprises one or more data objects in one or more classes and defines relationships between the one or more data objects in the one or more classes;
detect activity corresponding to a first data object in the one or more data objects of the relational data set by identifying an association between information gathered from at least one data source external to the relational data set in the one or more data sources external to the relational data set and information in the first data object, wherein the activity corresponding to the first data object is determined based at least in part on the information gathered from the at least one data source external to the relational data set;
determine whether the activity corresponding to the first data object exceeds a predefined threshold;
identify a second data object in the one or more data objects of the relational data set which is connected to the first data object based at least in part on an analysis of the relationships between the one or more data objects of the relational data set; and
monitor one or more additional data sources external to the relational data set and associated with the second data object based at least in part on a determination that the activity exceeds the predefined threshold.

30. The at least one non-transitory computer-readable medium of claim 29, wherein the relational data set comprises vetted data.

31. The at least one non-transitory computer-readable medium of claim 29, further storing computer-readable instructions that, when executed by at least one of the one or more computing devices, cause at least one of the one or more computing devices to update the second data object based at least in part on a determination that the activity exceeds the predefined threshold.

32. The at least one non-transitory computer-readable medium of claim 29, further storing computer-readable instructions that, when executed by at least one of the one or more computing devices, cause at least one of the one or more computing devices to:
transmit information relating to the second data object based at least in part on a determination that the activity corresponding to the first data object exceeds the predefined threshold.

33. The at least one non-transitory computer-readable medium of claim 29, wherein the one or more data sources external to the relational data set and comprise a plurality of data sources external to the relational data set and wherein the instructions that, when executed by at least one of the one or more computing devices, cause at least one of the one or more computing devices to determine whether the activity exceeds a predefined threshold further cause at least one of the one or more computing devices to:
determine how many distinct data sources in the plurality of data sources external to the relational data set and contributed information relating to the activity; and
designate the activity as exceeding the predefined threshold based at least in part on a determination that the number of distinct data sources is greater than a predetermined number.

34. The at least one non-transitory computer-readable medium of claim 29, wherein the instructions that, when executed by at least one of the one or more computing devices, cause at least one of the one or more computing devices to determine whether the activity exceeds a predefined threshold further cause at least one of the one or more computing devices to:
identify a reliability grade for the at least one data source external to the relational data set in the one or more data sources external to the relational data set; and
designate the activity as exceeding the predefined threshold based at least in part on a determination that the reliability grade is greater than a predetermined reliability grade.

35. The at least one non-transitory computer-readable medium of claim 29, the one or more additional sources external to the relational data set and associated with the second data object comprise one or more sources associated with a geographic location which is also associated with the second data object.

36. The at least one non-transitory computer-readable medium of claim 29, wherein the relational data set is a human geography data set and includes a hierarchical relationship class which defines hierarchical relationships between the one or more classes.

37. The at least one non-transitory computer-readable medium of claim 36, wherein the one or more classes include a parent social group class representing a parent social group which is defined as a first area on a map.

38. The at least one non-transitory computer-readable medium of claim 37, wherein the information gathered from the at least one data source external to the relational data set relates to an event, the first data object is a data object in the parent social group class, and wherein the instructions that, when executed by at least one of the one or more computing devices, cause at least one of the one or more computing devices to identify an association further cause at least one of the one or more computing devices to determine whether the event occurred in a geographic area that is within the first area.

39. The at least one non-transitory computer-readable medium of claim 38, wherein the second data object comprises a person data object corresponding to a person that is part of the parent social group.

40. The at least one non-transitory computer-readable medium of claim 29, wherein the first data object corresponds to a geographic area and the second data object corresponds to a person.

41. The at least one non-transitory computer-readable medium of claim 29, wherein the first data object corresponds to a commodity and the second data object corresponds to a social group.

42. The at least one non-transitory computer-readable medium of claim 32, wherein the information relating to the second data object comprises at least one of an alarm, a notification, a chart, or information regarding how the second data object is pertinent to the activity corresponding to the first data object.

* * * * *